United States Patent [19]
Ito

[11] Patent Number: 6,154,152
[45] Date of Patent: Nov. 28, 2000

[54] ROAD DATA MAINTENANCE SYSTEM AND ON-VEHICLE TERMINAL APPARATUS COMPATIBLE THEREWITH

[75] Inventor: Toru Ito, Nagoya, Japan

[73] Assignee: Toyota Jidosha Kabushiki Kaisha, Japan

[21] Appl. No.: 09/172,762

[22] Filed: Oct. 15, 1998

[30] Foreign Application Priority Data

Oct. 16, 1997 [JP] Japan .................................. 9-283555

[51] Int. Cl.⁷ .................................................. G08G 1/123
[52] U.S. Cl. ........................ 340/988; 340/995; 701/208; 701/213
[58] Field of Search .................................. 340/995, 990, 340/988; 701/208, 209, 210, 211, 213

[56] References Cited

U.S. PATENT DOCUMENTS

| | | | |
|---|---|---|---|
| 4,891,761 | 1/1990 | Gray et al. | 364/452 |
| 5,293,318 | 3/1994 | Fukushima | 340/995 |
| 5,699,255 | 12/1997 | Ellis et al. | 340/995 |
| 5,757,289 | 5/1998 | Nimura et al. | 340/995 |
| 5,948,042 | 9/1999 | Heimann et al. | 701/208 |

FOREIGN PATENT DOCUMENTS

| | | |
|---|---|---|
| DE 195 25 291 | 12/1996 | Germany . |
| 5-274592 | 10/1993 | Japan . |
| 8-271272 | 10/1996 | Japan . |

*Primary Examiner*—Brent A. Swarthout
*Attorney, Agent, or Firm*—Finnegan, Henderson, Farabow, Garrett & Dunner, L.L.P.

[57] ABSTRACT

Unpossessed road data is added to possessed road data stored in a road contour database of an information center. An on-vehicle terminal apparatus first compares a current position of a vehicle detected by a D-GPS unit against the road data stored in a storage section for storing road contour data of possessed roads. If the current position deviates from a known existing road, it is determined that the vehicle travels on an unpossessed road. Road data of the unpossessed road is then obtained based on a travel locus of the vehicle and sent to the information center together with a reliability index of the road data. The information center collects unpossessed road data from a plurality of sources, evaluates the reliability index for each data, and adds sufficiently reliable road data to the possessed road data. Thus, the information center can quickly obtain and utilize new and reliable road data.

13 Claims, 6 Drawing Sheets

EXAMPLE OF DETECTING A NEW BRIDGE ACROSS A RIVER BY A VEHICLE

| DOP | TRAVEL DISTANCE D OF (AUTONOMOUS NAVIGATION) | INTER-DEPARTURE POINT DISTANCE | |
|---|---|---|---|
| | | 30m OR OVER | LESS THAN 30m |
| SMALL | D ≤ D2 | A | B |
| | D > D2 | B | C |
| MEDIUM | D ≤ D2 | B | C |
| | D > D2 | C | C |
| LARGE | D ≤ D2 | C | C |
| | D > D2 | C | C |

A : VERY RELIABLE
B : SUFFICIENTLY RELIABLE
C : UNRELIABLE

Fig. 6

ROAD DATA MAINTENANCE SYSTEM AND ON-VEHICLE TERMINAL APPARATUS COMPATIBLE THEREWITH

BACKGROUND OF THE INVENTION

1. Field of the Invention

The present invention relates to a road data maintenance system, and more particularly, to a system capable of constantly updating road data possessed by an information center.

2. Description of the Related Art

Recently, various techniques associated with ITS (Intelligent Transport Systems) have been proposed and have become increasingly popular. One example of ITS is a vehicle information system in which a number of vehicles are connected with an information center via communication means so that data can be transferred between them. In such a system, each vehicle receives from the information center various types of useful information regarding the vehicle use. It is also proposed that the information center collects information useful for its operation from the vehicles.

In this type of system, map data, especially road data contained in a map, has an important role. The information center is provided with a database of road information including the latest road data. For example, the following uses for road data has been considered.

(a) Road data itself: Road data is sent to a vehicle which uses the received road data to navigate the vehicle;

(b) Guiding route: The information center prepares a guiding route sends it to the vehicle. The vehicle uses the guiding route for navigation. Preferably, the vehicle first sends to the information center various conditions including a start location and a destination, and other conditions required to determine a route;

(c) Traffic information: Traffic information regarding, for example, traffic congestion is prepared and sent to the vehicle; and (d) Destination information: Information concerning a destination of the vehicle is provided.

It is not easy for the vehicle alone to acquire the latest data, or to process a large amount of data. In the above system, it is expected that up-to-date, comprehensive road data can be handled by the information center.

Since it is desired for the information center to always store the latest road data, the road data is maintained as needed. During the data maintenance, new road data which is not stored in the information center (referred to as "unpossessed (unstored) road data" hereinafter) is added to the existing road data stored in the center (referred to as "possessed (stored) road data" hereinafter).

For example, when a new road (unpossessed road) is constructed which may include new bridges or tunnels, or when the contour of a road may change permanently or temporarily due to road construction, the road data possessed by the information center needs to be maintained using the contour of the unpossessed road or the location of intersections.

In a known system, new road data is prepared and forwarded to the information center by a cartographer who makes a map using air photos and field survey results. Since map making is not carried out frequently, the provision of new road data is delayed by the month so that the information center can receive it only sometime after the opening of the new road.

Alternatively, a special survey may be carried out before a new road is opened if the opening date is known in advance, but there still remains a need for an easier method of obtaining the road data.

As described above, there is a substantial delay in providing the unpossessed road data to the information center in the known technique. Thus, the real time acquisition of the latest information and maintenance of data by the information center have been prohibited.

Japanese Patent Laid-Open Publication No. Hei8-271272 discloses a navigation system in which an on-vehicle navigation system includes a CD-ROM (Compact Disc Read Only Memory) which stores road data. If a vehicle runs on a road which is not stored in the CD-ROM, data concerning this road will be stored in another memory other than the CD-ROM. As such, the navigation system can utilize the latest road information for route guidance. In this technique, however, the new road is detected exclusively for one vehicle. The system does not allow the maintenance of road data in the information center, which is required in the ITS, nor the new road data is available for other vehicles.

In addition, there is still a room for improving the reliability of newly detected road data in the above technique. Namely, the current position detecting means used for detecting the data may generate a large error. Also, the system may use the CD-ROM of an old version, generating less reliable road data. As the data becomes less reliable, various features including the navigation feature may operate improperly.

SUMMARY OF THE INVENTION

Therefore, an object of the present invention is to provide a road data maintenance system for maintaining road data possessed by an information center. The system can maintain the possessed road data relative to an unpossessed road immediately after the opening of the unpossessed road. Also, the system can maintain the road data using highly reliable data.

In order to achieve the above object, the road data maintenance system according to the present invention maintains possessed road data possessed by an information center by adding unpossessed road data which is not yet possessed by the information center to the possessed road data. The system includes an on-vehicle terminal apparatus connected to the information center via communication means. The on-vehicle terminal apparatus includes: means for detecting a current position of a vehicle; means for determining a candidate unpossessed road by judging whether the vehicle travels on the candidate unpossessed road based on the current position of the vehicle; and means for notifying the information center of road data of the candidate unpossessed road determined based on a locus of the current position of the vehicle. The information center includes maintenance means for evaluating the reliability of the road data of the candidate unpossessed road collected from a plurality of vehicles and adding the road data having a high reliability to the possessed road data.

According to the present invention, the road data of the candidate unpossessed road is sent from the vehicle to the information center that is connected to many vehicles. A vehicle that travels on the unpossessed road notifies information about the road. Thus, the information center need not wait until a source such as a map maker provides a new map and, instead, receives the road data of the unpossessed road immediately after the opening of the road. The information center includes maintenance means which evaluates the reliability of the road data of the unpossessed road collected from a plurality of vehicles, selects road data having a high reliability, and adds the selected data to the possessed road data.

Therefore, the present invention enables the information center to quickly obtain reliable unpossessed road data, as the information acquired by many vehicles is collected at the information center. Thus, the information center is always capable of distributing various types of information to each vehicle using the latest and accurate road data. The present invention preferably contributes to the ITS technique.

As used herein, the road data refers to data which includes road contour information in any format. It is well known in the art that the road data includes drawing data for generating an image, route calculating data for setting a route, matching data used for map matching, and so on. The present invention is applicable to all or to only selected kinds of road data. Since each data has a different format, the road data derived from the travel locus is converted to an appropriate format compatible with respective data formats before added to the possessed road data. The converting process may be performed on the vehicle or on the information center side.

Preferably, the on-vehicle terminal apparatus includes on-vehicle storage means for storing road data, whereby the means for determining the candidate unpossessed road compares the road data stored in the on-vehicle storage means against the current position of the vehicle. Also, it is preferable that the means for determining the candidate unpossessed road determines that the vehicle is traveling on an unpossessed road when the current position of the vehicle is away from the road of which data is stored in the on-vehicle storage means and the length of the travel locus of the vehicle exceeds a predetermined length and the current position of the vehicle is more than a predetermined distance away from the road. Thus, the means for determining the candidate unpossessed road can make accurate judgements.

In addition, it is preferable that the means for notifying road data notifies the information center of information about versions of the road data stored in the on-vehicle storage means together with the road data of the candidate unpossessed road. The road data stored in the vehicle may be of an older version than the possessed road data stored in the information center. Thus, the invention can appropriately maintain data by considering data versions.

In one aspect of the present invention, the means for notifying road data notifies the information center of a reliability index indicating the reliability of the road data of the candidate unpossessed road, together with the road data of the candidate unpossessed road. The maintenance means of the information center maintains data relative to a particular unpossessed road by using road data whose reliability index exceeds a predetermined level when more than a predetermined number of data of the unpossessed road is collected. Preferably, the reliability index is determined based on a detection accuracy of the means for detecting the current position of the vehicle when the candidate unpossessed road is detected. Also, it is preferable that the reliability index be determined based on a positional relationship between a departure point where the candidate unpossessed road deviates from the possessed road and other departure points existing on the possessed road.

In accordance with the present invention, each vehicle determines the reliability index and transmits it to the information center, while the information center receives the reliability index as well as road data from a plurality of vehicles. The use of the reliability index enables accurate reliability evaluation, which advantageously allows the data maintenance using highly reliable road data to be carried out.

BRIEF DESCRIPTION OF THE DRAWINGS

FIG. 6 shows other judging criteria used to determine the reliability index of unpossessed road data according to an embodiment 2.

DESCRIPTION OF PREFERRED EMBODIMENTS

Preferred embodiments of the present invention will be described below with reference to the attached drawings.

Embodiment 1

Figure 1:
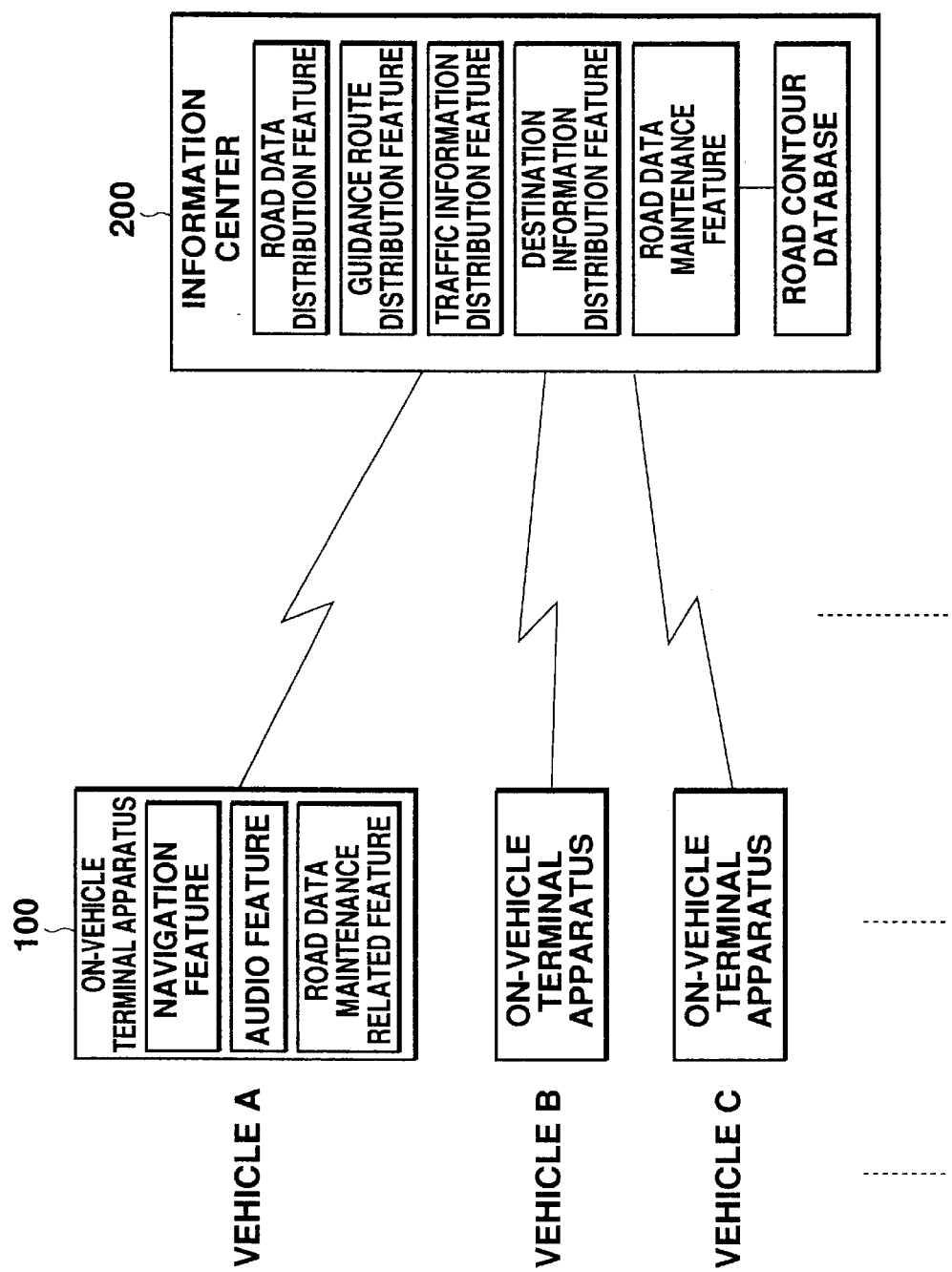
FIG. 1 is a block diagram showing an embodiment of a vehicle information system incorporating a road data maintenance system according to the present invention.

In a first embodiment of the present invention, a road data maintenance system is provided integrally with a vehicle information system which includes an information center and a vehicle. A general view of the vehicle information system is shown in FIG. 1. An on-vehicle terminal apparatus 100 has a feature associated with a road data maintenance feature of the present invention and may include a variety of other features, such as navigation and audio features. An information center 200 serves as an infrastructure apparatus which is connected to an unspecified large number of vehicles via a radio communication means. The information center 200 is not always connected to such a large number of vehicles and may be connected to selected vehicles, as needed. The information center 200 is capable of communicating data to and from each vehicle and has a feature to distribute various information to individual vehicles. For example, the features for distributing "road data", "a guiding route", "traffic information", and "destination information" as mentioned above are illustrated in FIG. 1. In addition, the information center 200 distributes various warnings and guidance useful when driving a vehicle. A special database concerning the contour of roads is provided in the information center 200 which also has a feature for maintaining such a database.

The road contour database in the information center stores road contour data of the widest area, which is referred to as road data in the present invention. The road contour data consists of various types of data including drawing data, route calculating data, matching data, and the like. The road contour data specifies the contour of each road. The following description is mainly directed to the road contour. Also, as mentioned above, a possessed (stored) road refers to a road whose data is already stored in the road contour database, while an unpossessed (unstored) road refers to the road whose data is not yet stored in the database. In the vehicle information system of FIG. 1, the road contour data may be included in map data having many other types of information, so that the road contour data may be transmitted to vehicles or used for route setting together with other pieces of information included in the map data.

Figure 2:
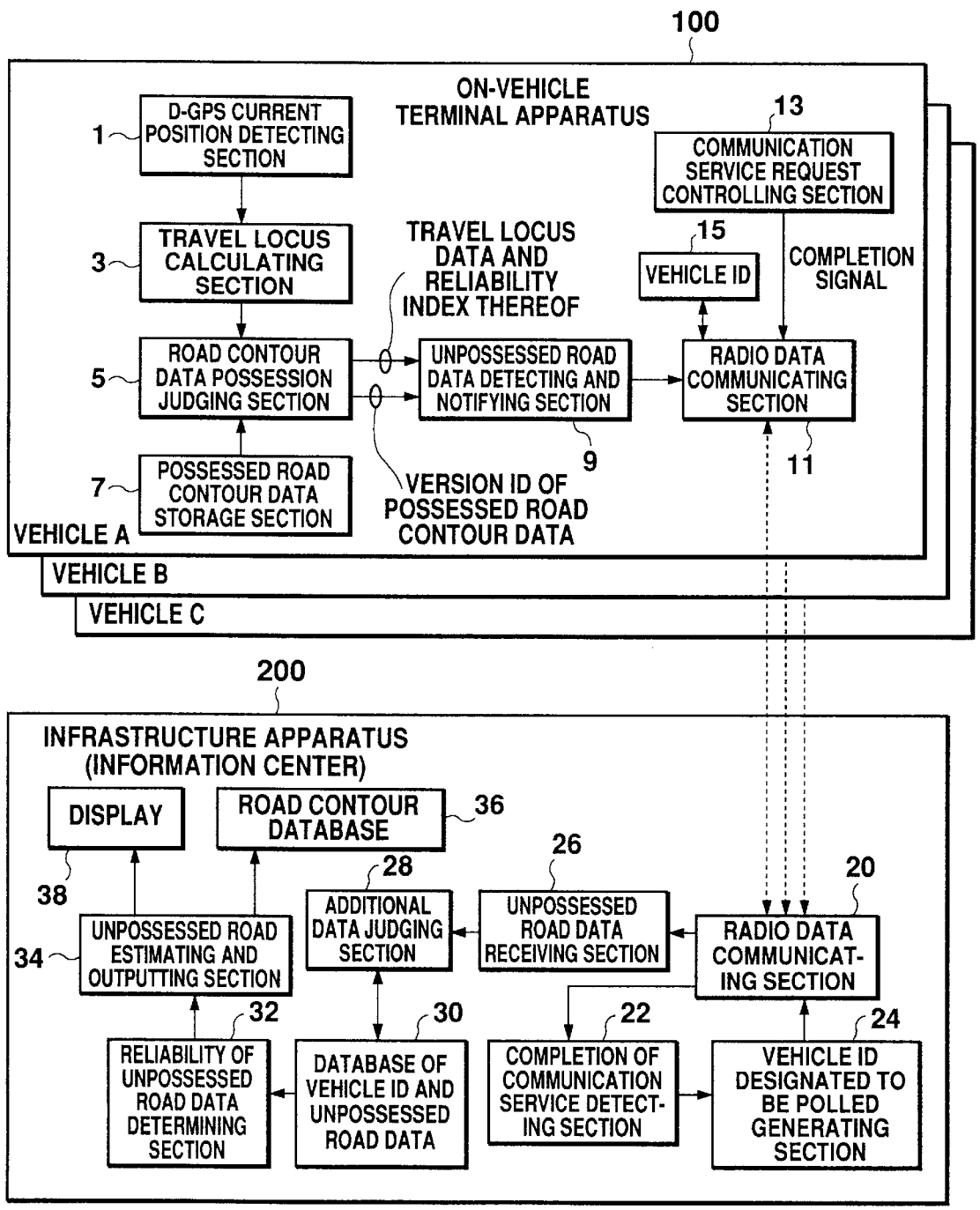
FIG. 2 is a block diagram showing a configuration of an embodiment of a road data maintenance system according to the present invention.

FIG. 2 shows a road data maintenance system of the present embodiment. As shown in FIG. 2, the information center 200 includes a road contour data base 36 to be maintained. The maintenance system of the present embodiment is described in detail below with reference to FIG. 2.

Configuration of the On-Vehicle Terminal Apparatus 100:

An on-vehicle terminal apparatus 100 is provided with a D-GPS (Differential-Global Positioning Systems) unit 1. The D-GPS unit 1 receives a signal transmitted from a GPS satellite to detect the current position of a vehicle. The detected position includes a relatively large error component. The current position of the vehicle is corrected using the error component transmitted via an FM multiplex broadcasting and received by a receiver (not shown), determining an accurate current position. The D-GPS unit 1 is capable of accurately detecting an absolute coordinate position of the vehicle, with an error being in the order of as small as several meters, thereby providing a correct current position in real time as the vehicle moves. Thus, the D-GPS unit 1 is the current most suitable current position detecting means for detecting unpossessed roads. It is noted that outputs of the D-GPS unit 1 may also be used for normal navigation.

The current position of the vehicle detected by the D-GPS unit 1 is sent to a locus calculating section 3 for determining a travel locus of a vehicle. The locus calculating section 3 is provided within a processor (CPU) with other components which will be described later in a control section of the on-vehicle terminal apparatus 100. The locus calculating section 3 traces the current position data entered successively thereto to determine a locus of current position of the vehicle.

The travel locus of the vehicle is sent to a judging section 5 for determining the presence of road contour data. The judging section 5 refers to possessed road contour data already stored in a storage section 7 for storing road contour data of possessed roads. Road contour data for all roads is stored in the storage section 7. This road contour information may be used, as needed, in the navigation feature of the on-vehicle terminal apparatus 100. In the present embodiment, the data stored in the storage section 7 are substantially the same as the data contained in the road contour database of the information center 200, but the data may not be the same and the storage section 7 is only required to store such data as sufficient to identify road contour of the roads within a given area.

The judging section 5 compares the current position and travel locus of the vehicle against the contour of the possessed roads, determining whether the vehicle has traveled off the possessed roads, in other words, the vehicle traveled along an unpossessed road.

Figure 3:
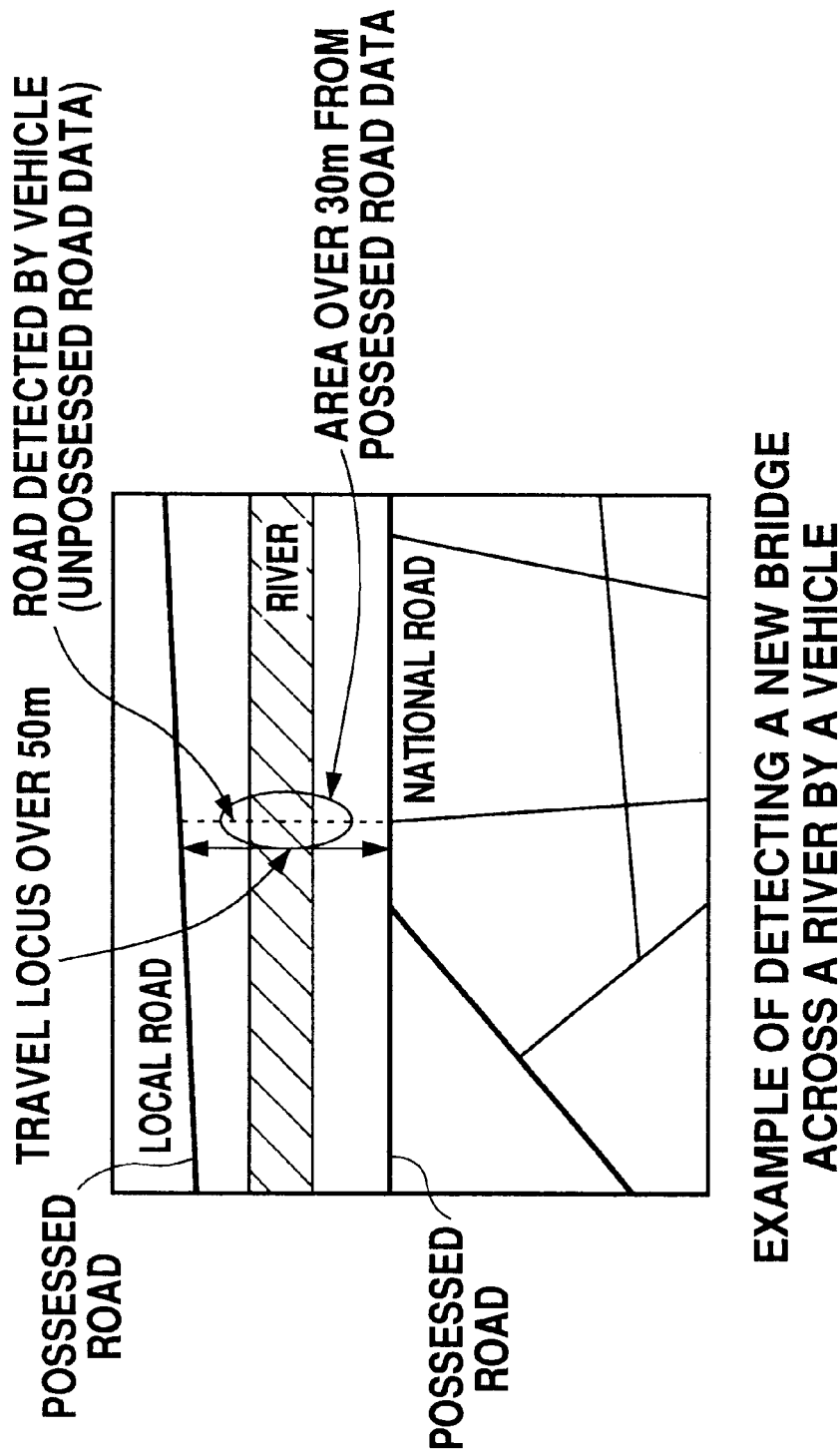
FIG. 3 shows judging criteria used to detect whether a vehicle travels on an unpossessed road.

Referring to FIG. 3, criteria of judgement of unpossessed roads are described below. It is assumed that a new bridge (shown in a dotted line in the figure) is constructed across a river (shown in hatching) in the upper part of FIG. 3 and a road now runs over the new bridge. First, the judging section 5 compares the current position and travel locus of the vehicle against the contour of possessed roads to determine whether or not the current position deviates from the possessed road. Further, the judging section 5 determines that the vehicle is on an unpossessed road when the following two conditions are met simultaneously.

(1) The travel locus throughout the period when the vehicle deviates from the possessed road (i.e., until the vehicle returns to the possessed road) exceeds a predetermined length (50 m); and (2) The current position of the vehicle is more than a predetermined distance (30 m) away from any possessed road. In the example of FIG. 3, the bridge extends for more than 50 m, while the center part of the bridge marked with an oval is more than 30 m away from both roads running on each side of the bridge. When the vehicle crosses the bridge, it is determined that the vehicle is on a candidate unpossessed road. Such criteria of judgement ensure that any unpossessed road be detected by preventing erroneous judgement where the current position of the vehicle is only a small distance away from the possessed road within tolerance.

During the judgement of unpossessed roads, map matching is not carried out in the step of detecting the current position of the vehicle, because map matching may cause an erroneous judgement that the current position is on the possessed road even when this is not true. To avoid this, map matching is prohibited during the judgement of unpossessed roads.

When the unpossessed road is found, the judging section 5 for determining the presence of road contour data sends notifying information including the following (a) to (c) to a notifying section 9.

(a) "Travel locus data on the unpossessed road": This is a travel locus (shown in a dotted line in FIG. 3) between two points, one of which is a location (a starting point) where the vehicle deviates from the possessed road, and the other is a location (an end point) where the vehicle returned to the possessed road. Thus, the locus represents the contour of a given unpossessed road. The data consists of a sequentially obtained series of coordinates for the current position of the vehicle.

(b) "Reliability index": This index represents the degree of reliability of the travel locus described in section (a) above. Based on the index, the accuracy of the detected road contour and the judgement of the unpossessed road is known. In this embodiment, three ranks of indices ranging from ranks A to C are used. Rank A is the top rank indicating that the data is "fully reliable", while data in rank B is "reliable enough" and rank C is "less reliable." Criteria of ranking is illustrated in FIGS. 4A and 4B.

Figures 4A, 4B:
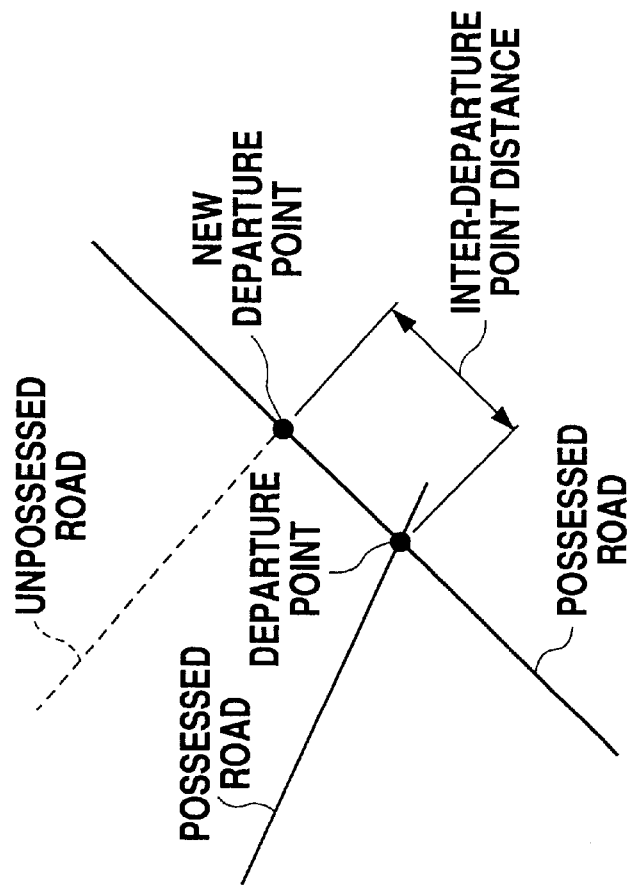
FIGS. 4A and 4B show judging criteria used to determine the reliability index of an unpossessed road data.

Referring to FIGS. 4A and 4B, the reliability index is determined in accordance with an estimated accuracy of position detection, where DOP (Dilution of Precision) values of the D-GPS device 1 are considered. The DOP values indicate the accuracy of position detection by GPS. The value changes according to the change in position of a GPS satellite used for calculation of positions. As the DOP value becomes smaller, the accuracy of position detection increases.

In order to determine the reliability index, an expected accuracy of the road contour database is used. Referring to FIG. 4B, a departure point (a new departure point) of the unpossessed road from the possessed road is identified, which corresponds to either end (i.e., the starting point or the end point) of the unpossessed road. Also, if the unpossessed road crosses the possessed road, the new departure point is an intersection of both roads. First, from the departure points excluding the new departure point (i.e., the existing departure points), one departure point which passes through the possessed road and is the nearest to the new departure point is determined. Then, a distance between the new departure point and the selected existing departure point (i.e., an inter-departure point distance) is determined.

The reliability index is determined based on the inter-departure point distance and the DOP value using a table shown in FIG. 4A. When the DOP value is small (i.e., the accuracy of the current position is high) and the inter-departure point distance is longer than a predetermined distance (i.e., 30 m), the reliability index is in rank A. As the DOP value increases, the rank of the reliability index decreases. This is also true when the inter-departure point distance becomes shorter, because as it becomes longer, the probability of mistakenly recognizing the possessed road as the unpossessed road decreases.

Rather than transmitting the reliability index ranging from ranks A to C to the information center from the vehicle, the DOP value and the inter-departure point distance may be transmitted (so the reliability index is given in the form of DOP values and the inter-departure point distance). In this case, the information center determines the reliability index using the table shown in FIG. 4A in accordance with the received DOP value and the distance.

Alternatively, the DOP value alone may be sent to the information center from the vehicle and used as the reliability index. In this case, the information center calculates the inter-departure point distance based on the travel locus defined in section (a) above and the calculated distance and the DOP value are used to determine the reliability level.

(c) "Version ID of road contour data": This ID indicates which version of data is stored in the storage section 7 for storing road contour data of possessed roads. The version ID is stored in the storage section 7 and read from it to be added to the notifying information together with (a) and (b) described above. The version ID is used to know whether the data used for the judgement of the unpossessed road is old or new. This helps the data handling be carried out efficiently in the information center. For example, the unpossessed road data obtained from the old version data is not supposed to be maintained, because such data is already maintained.

The notifying information including the above-described (a) travel locus, (b) reliability index, and (c) version ID is transmitted to the notifying section 9. The section 9 holds the received notifying information temporarily until after the information center 200 carries out a communication poll, as will be described in more detail below. If the vehicle finds a plurality of unpossessed roads, the notifying information concerning all unpossessed roads found is held until the polling. In response to the polling, the notifying section 9 transfers the notifying information to a radio data communicating section 11 which transmits the information to the information center 200.

Communication Polling:

In communication polling, the information center places a call to request communication with a called party, i.e., a vehicle, inquiring if any unpossessed road is found.

In the present embodiment, the timing of communication polling is set as follows. As mentioned above, the system of FIG. 1 distributes various types of information, such as road data and route guidance. During the distribution of information, the vehicle places a call to the information center to request data transfer. In response to this, the information center sends the requested information to the vehicle. When this communication sequence is done, the information center immediately polls the vehicle.

Referring to FIG. 2 again, the radio data communicating section 11 of the vehicle communicates data to and from a radio data communicating section 20 provided on the infrastructure side. On the vehicle side, a request control section 13 for controlling a communication service request controls tasks required to acquire information, such as a guiding route. The request control section 13 sends an information distributing request to the infrastructure apparatus. At this time, the vehicle ID read from a vehicle ID storage section 15 is also sent, as needed, such that the information center 200 can communicate with respective vehicles. The information center 200 responds to the request from the vehicle by sending the guiding route or traffic information to the vehicle. Upon receiving the requested information, the request control section 13 outputs a completion signal which will be transmitted from the radio data communicating section 11.

The completion signal is received by the radio data communicating section 20 of the information center 200. A detecting section 22 detects both the completion of the communication service and the ID of the vehicle from which the completion signal is originated. The detected vehicle ID is sent to an ID generating section 24 for generating an ID of the vehicle designated to be polled. The ID generating section 24 creates the vehicle ID for polling. Then, the information center 200 places a call to communicate with the designated vehicle and request it to provide notifying information concerning the unpossessed road. The vehicle receives the request at the notifying section 9 and responds to the request by sending back the possessed notifying information with the vehicle ID added thereto via the radio data communicating section 11. If no unpossessed road is found, the information center 200 receives such response.

During polling, the information center 200 preferably limits versions of possessed road data of the vehicle (which data was considered in judging the unpossessed roads). Thus, the information center 200 can collect the unpossessed road data detected based on only the specified versions of possessed road data. Even if the vehicle has other unpossessed road data detected based on undesignated versions of possessed road data, the vehicle never transfers such data (as in a case where no unpossessed road is found), nor the information center receives it. This improves the efficiency of data handling in the information center, because, in one case, there is no need to collect unpossessed road data detected based on old data and already maintained.

Such a polling method has certain advantages. In the present embodiment, it is assumed that a communication fee is charged to the calling party. Since the information center 200 is a primary and direct beneficiary of this road data maintenance system, and users of the vehicle are only secondary and indirect beneficiaries, any fees concerning the unpossessed roads will be charged to the calling party, i.e., the information center 200.

In another communication system, the vehicles may be exempted from any charge at all times even if the vehicles place a call, and all fees are charged to the information center. In this case, however, certain measures have to be provided to prevent unnecessary accesses from the vehicles.

Alternatively, a number of vehicles may be polled sequentially without setting the polling timing as described above. However, since average vehicles may remain unused for a longer period than in use, it is less probable in practice for the information center to communicate with such vehicles.

Unlike the above modifications, the present embodiment eliminates problems associated with the increase of unnecessary access. Probability of establishing a communication with vehicles is high, because the communication with a particular vehicle is established for distributing information to the vehicle immediately before the polling. Thus, the polling process of the present embodiment renders the information center 200 to effectively obtain the unpossessed road information.

In another modification, the vehicle may access and send the unpossessed road information to the information center as part of the regular data communication therewith. As in the above embodiment, the communication fee is preferably charged to the information center with respect to the unpossessed road information.

Configuration of Infrastructure:

The information center 200 is constructed as follows. As described above, the information center 200 receives the notifying information concerning the unpossessed roads from the on-vehicle terminal apparatus 100 by means of polling. The information center 200 communicates with an unspecified large number of vehicles to gather notifying information. Using this information, the road contour database is automatically constructed as described below.

The radio data communicating section 20 performs a variety of communication with vehicles. An unpossessed road data receiving section 26 receives the notifying information of the unpossessed road from the vehicle and transfers it to an additional data judging section 28. The additional data judging section 28 determines whether the received notifying information is to be added to a database of unpossessed roads 30 which stores the notifying information obtained before. The notifying information includes the contour (or the travel locus) of a candidate unpossessed road, the reliability index thereof, the version ID of the on-vehicle road data, and the vehicle ID. The additional data judging section 28 uses the travel locus and the vehicle ID to check if the new notifying information matches any information (i.e., the vehicle ID and the travel locus ) already stored in the database. If not, the newly received notifying information is written in the database 30.

A judging section 32 for judging the reliability of unpossesed road data analyzes the information written in the database 30 and determines whether a sufficient amount of sufficiently reliable information has been collected. Each piece of notifying information concerning unpossessed roads is labeled with a reliability index from rank A to rank C. When more than a predetermined amount of reliability indices above a certain level are collected from different vehicles, it is determined that sufficiently reliable information is obtained. Specifically, either condition (1) or (2) below should be satisfied.

(1) More than two pieces of notifying information labeled rank A are present concerning an unpossessed road at a certain location; or (2) More than nine pieces of notifying information labeled rank B or higher are present concerning the unpossessed road of a certain location.

For example, assume that the condition (1) is satisfied. The judging section 32 reads the road contour data of an unpossessed road labeled rank A from the database 30 and sends the data to an output section 34 for estimating and outputting an non-possessed road. The output section 34 receives three road contour data of almost the same contour. These three data are averaged to derive one road contour data. Preferably, the route mean function is used to extract a road contour (which is approximate to all three contour data) passing between these three contours. The same procedure is carried out when condition (2) is satisfied, except that ten contour data are processed to create one road contour data.

The output section 34 outputs the extracted road contour data to a road contour database 36 which stores the road contour of the possessed roads. The unpossessed road contour data determined above is added to the possessed road data. Also, the output section 34 activates a display 38 to indicate to an operator of the information center that the new road contour data is added.

As described above, the road contour data includes display data, route calculating data, map matching data, and so on, each data having a different format. Thus, the locus data of the unpossessed road is processed to suit to each data format. The existing road contour data in the database of road contour 36 is also modified as needed. For example, the new road data is processed so as to be associated with the existing roads, as it is well known that multiple roads are associated with each other to enable various types of data processing including route calculation.

The unpossessed road data thus obtained is used as temporary road data which will be appropriately sent to each vehicle and used to prepare a guiding route or the traffic information.

In the present embodiment, data collection of the data concerning a given unpossessed road begins immediately after the vehicle starts travelling the road. Therefore, the information center 200 can know the start of using a new road quickly and judge that the measurement or data collection of the road is necessary. After the measurement or shooting of air photographs of the road is done, the information center 200 receives the formal new road data and replaces it with the temporary data.

In the present embodiment, it is possible for the information center 200 to acquire the latest road contour data at a very early timing. In addition, the data is collected from a plurality of vehicles and the reliability of each data is evaluated, whereby the accurate road contour data can be obtained. This system can advantageously be used for implementing the ITS technique, such as the provision of driving cautions or warnings which require the latest road data, or the provision of guiding route using the road data for newly constructed roads.

Further, the present embodiment enables the correct judgement to be made as to which part of the road contour data possessed in the database of road contour 36 of the information center needs to be maintained. The designated part of the data may be maintained automatically or by an operator. Advantageously, the road data is maintained easily, the maintenance cost is reduced, and the vehicles with ITS can be offered to a user at a reasonable price.

In one modification, light (possibly infrared) beacons or radio beacons may be used to detect the current position of the vehicle, rather than the D-GPS unit 1 used in the above embodiment. However, such beacons are presently only applicable within a very limited area. Also, this system still requires that the D-GPS be used for the measurement of the position data applied to such beacons. Thus, it may be preferable to use the beacons together with the D-GPS.

Embodiment 2

The embodiment 1 includes the D-GPS unit 1 for detecting the current position of the vehicle. An embodiment 2 is similar to the embodiment 1 shown FIGS. 1 and 2, except that a gyrosensor and a vehicle speed sensor are provided in addition to the D-GPS unit 1.

In this embodiment, the position detection using the satellite navigation system with the D-GPS unit 1 is carried out and, in addition, the current position is detected based on the outputs of the gyrosensor and the vehicle speed sensor in accordance with the principles of autonomous navigation. The vehicle position is normally detected by the D-GPS unit 1, but when the vehicle is no longer capable of receiving the radio wave from the GPS satellite, the system switches to the autonomous navigation system.

In this embodiment, therefore, even when the vehicle travels on a certain type of newly constructed road, e.g., a tunnel, it is still possible to detect the travel locus of the vehicle. The system can also determine that the road running through the tunnel is the unpossessed road. The information concerning the unpossessed road is also sent to the information center from the vehicle.

Figure 5:
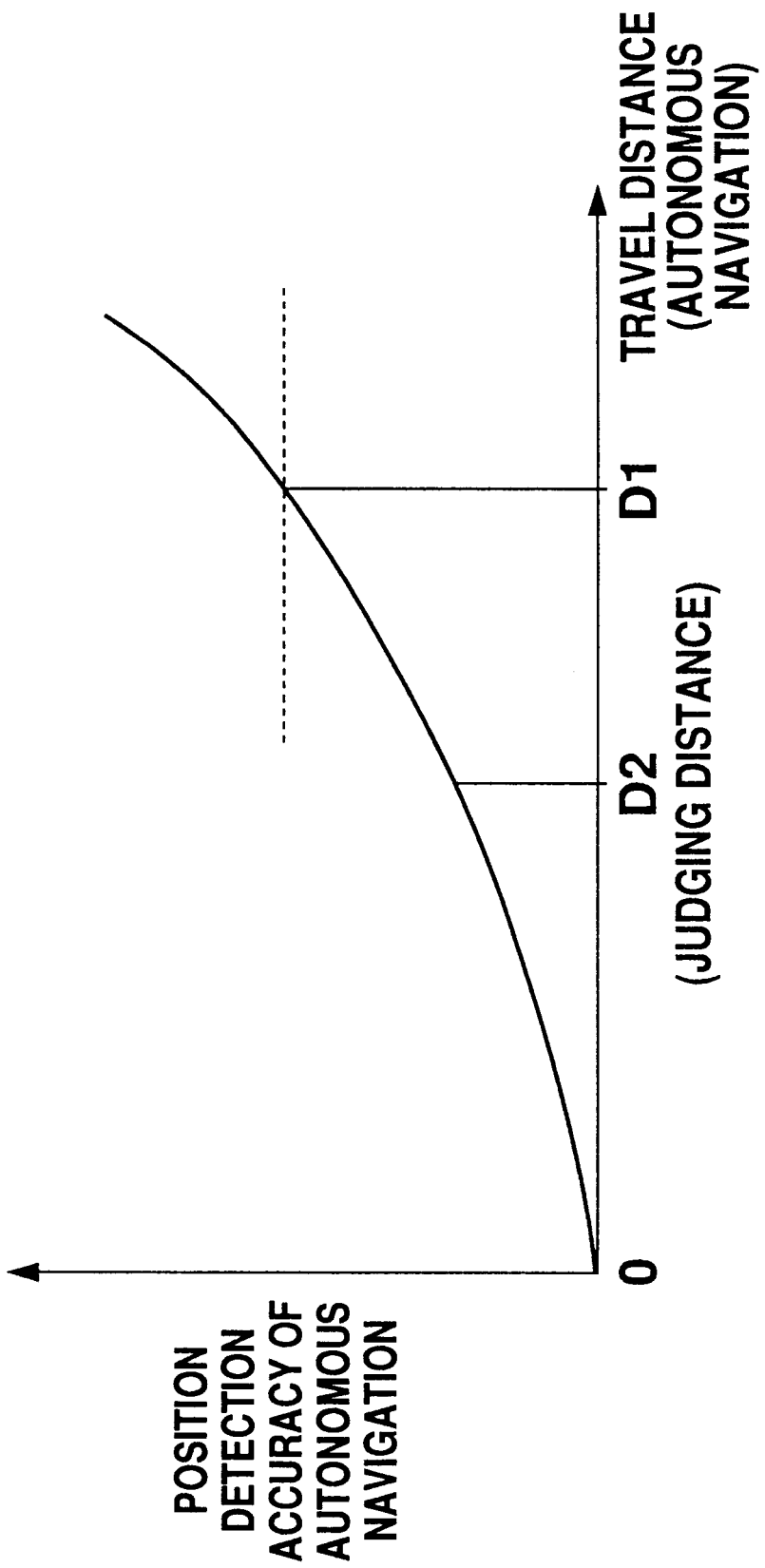
FIG. 5 is a graph used to explain an accuracy of the current position detection by autonomous navigation.

One problem is that the autonomous navigation system using the gyrosensor or the vehicle speed sensor is less accurate than the system using the D-GPS at present. FIG. 5 is a graph showing the detection accuracy of the autonomous navigation system. The origin zero (0) indicates a place where the current position detection is carried out last time using the D-GPS. If the vehicle starts this point and enters a certain road, e.g., a tunnel, then the autonomous navigation system is started. As the vehicle moves away from the point where the D-GPS is used last time and a travel distance (referred to as "an autonomous travel distance" hereinafter) increases, an estimated position detection error also increases.

Considering such an increase of error, this embodiment advantageously sets an allowance value D1 of the autonomous travel distance, as shown in FIG. 5. Only the current positions detected before the autonomous travel distance reaches the allowance value D1 are used for the judgement of the unpossessed road.

For example, assuming that the vehicle runs through a newly constructed tunnel, if the tunnel is short, then the vehicle exits the tunnel before the autonomous travel distance reaches the allowance value D1 and the current position detection using the D-GPS is resumed. In this case, the entire length of the tunnel is considered for the judgement of the unpossessed road.

In contrast, if the tunnel is long, the vehicle still remains in the tunnel even when the allowance value D1 is reached. Thus, only a portion of the tunnel (to a certain length from the front) is considered for detecting the presence of the unpossessed road, and the corresponding travel locus is sent to the information center 200. Using the received information, the information center 200 determines if other means must be used to acquire the latest road contour data.

In regard to the estimated accuracy of the autonomous navigation, the embodiment 2 uses a modified method to determine the reliability index of the unpossessed road contour data. As indicated in FIG. 5, a distance for judgement D2 is set as a threshold used for judging the reliability of data. The autonomous travel distance is compared against the distance D2 to determine the reliability index.

FIG. 6 shows a table for determining the reliability index, which is constructed by adding the judgement distance D2 to the table of FIG. 4 described before in connection with the embodiment 1. In the table of FIG. 6, the DOP value is the same as that used when the D-GPS was last used. It is assumed that a distance from the start point of autonomous travelling of the vehicle to the start point of the unpossessed road is indicated by D. The judging section 5 for determining the possession of road contour data detects the distance D, and determines whether (1) D≦D2 or (2) D>D2 is satisfied. If the D-GPS is in use (i.e., D=0), the condition (1) is satisfied. As shown in FIG. 6, it is determined that the reliability is higher when D≦D2 than when D>D2. Alternatively, the reliability index may be determined using the end point of the unpossessed road, instead of the start point thereof.

Other components of the embodiment 2 are similar to those of the embodiment 1. As described above, the embodiment 2 can detect the unpossessed road which is located where no radio waves can reach from the GPS satellite, and maintain the road data based on the detected unpossessed road. In particular, it is appropriately determined whether the detected unpossessed road data is applicable and what the reliability of the data is, depending on the autonomous navigation features. In this way, the information center can possess a wide range of accurate data.

It is noted that the travel time of the vehicle, rather than the travel distance of the vehicle, may be used for making various judgements, as described above in connection with FIGS. 5 and 6. In this case, the structure of the system remains unchanged, except where travel distance be replaced by travel time.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A road data maintenance system for maintaining possessed road data possessed by an information center by adding unpossessed road data which is not possessed by said information center to said possessed road data, said system comprising an on-vehicle terminal apparatus connectable to said information center via communication means, including:

position detecting means for detecting a current position of a vehicle;

possession judging means for judging whether the road the vehicle travels on is a candidate unpossessed road based on the current position of the vehicle; and notifying means for notifying said information center of candidate unpossessed road data obtained based on a locus of said current position of the vehicle, wherein said information center includes maintenance means for evaluating the reliability of the candidate unpossessed road data collected from a plurality of vehicles and adding road data having a high reliability to said possessed road data.

2. The road data maintenance system according to claim 1, wherein said on-vehicle terminal apparatus includes on-vehicle storage means for storing road data, and said possession judging means compares the current position of the vehicle with the road data stored in said on-vehicle storage means.

3. The road data maintenance system according to claim 2, wherein said possession judging means determines that the vehicle travels on the candidate unpossessed road when said current position of the vehicle is more than a predetermined distance away from a road whose data is stored in said on-vehicle storage means and the length of a travel locus during deviation exceeds a predetermined length.

4. The road data maintenance system according to claim 2, wherein said notifying means notifies said information center as to which version of the road data is stored in said on-vehicle storage means when sending said candidate unpossessed road data.

5. The road data maintenance system according to claim 1, wherein said notifying means in the vehicle supplies said information center with a reliability index indicating the reliability of said candidate unpossessed road data when sending said candidate unpossessed roaddata, and said maintenance means of said information center performs data maintenance using the candidate unpossessed road data when more than a predetermined amount of the candidate unpossessed road data having a reliability index exceeding a predetermined level is collected from different sources.

6. The road data maintenance system according to claim 5, wherein
said reliability index is determined based on a detection accuracy of said position detecting means when said candidate unpossessed road is detected.

7. The road data maintenance system according to claim 5, wherein
said reliability index is determined based on a positional relationship between a departure point where said candidate unpossessed road deviates from the possessed road and other departure points existing on the possessed road.

8. The road data maintenance system according to claim 6, wherein
said position detecting means includes a differential-global positioning systems unit, and
said reliability index is determined based on a dilution of precision value of said differential-global positioning systems unit.

9. The road data maintenance system according to claim 8, wherein
said position detecting means further includes an autonomous navigation type detecting device having a gyrosensor, and
said reliability index is determined based on the length of a section where said autonomous navigation type detecting device detects the current position of the vehicle.

10. The road data maintenance system according to claim 9, wherein
said possession judging means determines whether a road is a candidate unpossessed road before said length of the section reaches a predetermined allowance value, by using only the current position of the vehicle, the current position of the vehicle being detected by said autonomous navigation type detecting device.

11. An on-vehicle terminal apparatus mounted on a vehicle and connected via communication means to an information center to which said on-vehicle terminal apparatus provides information for maintaining possessed road data which is possessed by said information center, comprising:
position detecting means for detecting a current position of a vehicle,
possession judging means for judging whether the vehicle travels on a candidate unpossessed road for which data is not stored in said information center, based on said current position of the vehicle; and
notifying means for notifying said information center of candidate unpossessed road data obtained based on a locus of said current position of the vehicle, and a reliability index indicating the reliability of said road data.

12. The on-vehicle terminal apparatus according to claim 11, wherein
said reliability index is determined based on a detection accuracy of said position detecting means when said candidate unpossessed road is detected.

13. The on-vehicle terminal apparatus according to claim 11, wherein
said reliability index is determined based on a positional relationship between a departure point where said candidate unpossessed road deviates from the possessed road and other departure points existing on the possessed road.

* * * * *